United States Patent
Yang et al.

(10) Patent No.: US 11,146,995 B2
(45) Date of Patent: Oct. 12, 2021

(54) MANAGEMENT METHOD, DEVICE, EQUIPMENT AND STORAGE MEDIUM FOR MOBILE HANDOVER

(71) Applicant: ZTE CORPORATION, Shenzhen (CN)

(72) Inventors: Li Yang, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 41 days.

(21) Appl. No.: 16/618,453

(22) PCT Filed: Apr. 8, 2018

(86) PCT No.: PCT/CN2018/082207
§ 371 (c)(1),
(2) Date: Dec. 2, 2019

(87) PCT Pub. No.: WO2018/219039
PCT Pub. Date: Dec. 6, 2018

(65) Prior Publication Data
US 2020/0120552 A1    Apr. 16, 2020

(30) Foreign Application Priority Data

Jun. 1, 2017 (CN) .......................... 201710403770.4

(51) Int. Cl.
*H04W 36/00* (2009.01)
*H04W 36/02* (2009.01)
(Continued)

(52) U.S. Cl.
CPC ... *H04W 36/0027* (2013.01); *H04W 36/0038* (2013.01); *H04W 36/0058* (2018.08);
(Continued)

(58) Field of Classification Search
None
See application file for complete search history.

(56) References Cited

U.S. PATENT DOCUMENTS 9,832,660 B2 * 11/2017 Uchino ................. H04W 28/14
9,924,380 B2 *  3/2018 Uchino ................. H04W 36/08
(Continued)

FOREIGN PATENT DOCUMENTS

CN        104640165        5/2015
CN        106559916        4/2017
(Continued)

OTHER PUBLICATIONS

International Search Report for Application No. PCT/CN2018/082207 dated Jul. 18, 2018; 6 pages.

*Primary Examiner* — Tri H Phan
(74) *Attorney, Agent, or Firm* — Bond Schoeneck & King, PLLC; George Mcguire

(57) ABSTRACT

Provided are a method, a device, equipment and a storage medium for managing a mobile handover. When the method for managing the mobile handover is applied to a source secondary base station, the method includes: in response to determining to switch a set user equipment (UE) to a target base station, sending a handover request message to the target base station; and in response to receiving a handover request acknowledgement message sent by the target base station, sending a handover command message to the UE by using a signaling radio bearer (SCG SRB) of a source secondary base station side to trigger the UE to perform a random access attempt on a serving cell under the target base station.

12 Claims, 5 Drawing Sheets

(51) Int. Cl.
  *H04W 36/08* (2009.01)
  *H04W 36/38* (2009.01)
(52) U.S. Cl.
  CPC ... *H04W 36/0069* (2018.08); *H04W 36/0072* (2013.01); *H04W 36/023* (2013.01); *H04W 36/08* (2013.01); *H04W 36/38* (2013.01)

(56) References Cited

U.S. PATENT DOCUMENTS

| | | | | |
|---|---|---|---|---|
| 9,930,016 B2* | 3/2018 | Ryoo | ................ | H04W 12/0431 |
| 10,085,189 B2* | 9/2018 | Mitsui | ................... | H04W 36/18 |
| 10,432,291 B2* | 10/2019 | Agiwal | ................. | H04W 24/02 |
| 10,524,277 B2* | 12/2019 | Kubota | ................. | H04W 76/15 |
| 10,582,523 B2* | 3/2020 | Kubota | ................. | H04W 36/32 |
| 2020/0187064 A1* | 6/2020 | Susitaival | ......... | H04W 36/0069 |

FOREIGN PATENT DOCUMENTS

| | | | | |
|---|---|---|---|---|
| CN | 106797587 | 5/2017 | | |
| WO | 2015009075 | 1/2015 | | |
| WO | WO-2018171577 A1 * | 9/2018 | ............ | H04W 76/19 |

* cited by examiner

MANAGEMENT METHOD, DEVICE, EQUIPMENT AND STORAGE MEDIUM FOR MOBILE HANDOVER

CROSS REFERENCE TO RELATED APPLICATIONS

This is a National Stage Application, filed under 35 U.S.C. 371, of International Patent Application No. PCT/CN2018/082207, filed on Apr. 8, 2018, which claims priority to Chinese patent application No. 201710403770.4 filed on Jun. 1, 2017, contents of both of which are incorporated herein by reference in their entireties.

TECHNICAL FIELD

The present disclosure relates to communications and, in particular, to a management method, device, equipment and storage medium for a mobile handover.

BACKGROUND

In the Rel-12 version of the 4G Long Term Evolution (LTE), dual-connectivity (DC) technology is standardized, so that a user equipment (UE) can establish two separate radio link (RL) connections with a master evolved Node B (MeNB) and a secondary eNB (SeNB) at the same time, where the two connections are a master cell group (MCG) RL and a secondary cell group (SCG) RL respectively. A specific LTE E-UTRA radio access bearer (E-RAB) of the UE can be configured as an MCG bearer, an SCG bearer or a split bearer (downlink distribution only), and at this time, the UE can simultaneously obtain data radio bearer (DRB) services provided through radio resources of two non co-sited inter-frequency base stations.

In the Rel-13 version of the LTE, enhanced DC (eDC) technology is further standardized, realizing that the UE establishes two separate RL connections with the MeNB and the SeNB at the same time. A specific E-RAB of the UE can be configured as a split bearer (supplemented with uplink distribution). At this time, the UE can simultaneously obtain DRB services provided through radio resources of two non-co-site inter-frequency base stations, and some enhanced mobility scenarios are additionally supported, such as a cross-MeNB handover with the SeNB unchanged.

For the conventional LET (e)DC, only a signaling radio bearer (SRB) on an MeNB side is configured between an eNB and a UE. The SRB on the MeNB side is called the MCG SRB and is used for transmitting a radio resource control (RRC) message on an MCG side. The SeNB side only has a common SRB 0 for uplink random access, and since it does not have a dedicated SCG SRB, thus it cannot directly transmit an RRC message on the SCG side. Therefore, any configuration operation action related to the RRC on the SeNB side must be coordinated with the MeNB via an X2 interface procedure, and then transmit RRC message interaction with the UE by means of the MCG SRB.

In the conventional LTE DC or multi-connectivity (MC) configuration operation, only a master node (MN) is configured with a dedicated SRB. The MN is responsible for mobility management of the UE based on a basic handover procedure in a single-connect mode, that is, the MN is responsible for selection of a handover target base station node or serving cell, and sequentially executes a handover preparation procedure, a handover execution procedure and a handover completion procedure. FIG. 1 is a schematic diagram illustrating a handover method of a UE from DC to single connection in a conventional LTE DC working mode, that is, a flowchart of a handover controlled by a source MeNB to a target eNB. The method includes steps 0 to 12 described below.

In step 0, the UE performs radio resource management (RRM) measurement on an adjacent base station node or serving cell, obtains that a serving cell under a certain target eNB has good signal quality and is suitable to serve as a handover target serving cell, and reports the serving cell to the source MeNB, so as to trigger a mobile handover procedure.

In step 1, the MeNB initiates a handover request (HO request) message to the target eNB, and notifies the target eNB of an RRC configuration and context of the UE in the current DC mode.

In step 2, after admission control and resource pre-allocation, the target eNB returns a handover request acknowledgement (HO request ACK) message to the MeNB, and notifies the MeNB of a RRC configuration and context of the UE in the target eNB.

In step 3, the MeNB sends an RRC connection reconfiguration message via an MCG SRB, where the RRC connection reconfiguration message contains a UE handover command and access configuration information of the UE in the target eNB or the serving cell.

In step 4, the UE leaves all serving cells in the current source MeNB and the source SeNB, disconnects the MCG RL, the SCG RL and related data transmission, and performs a random access attempt on the serving cell under the target eNB.

In step 5, the MeNB initiates an SeNB release request message to the SeNB, releases the source SeNB, and lets the UE return to the single-connect working mode, where the release request message contains address information of data forwarding to let the data in the SCG bearer forward.

In step 6, the MeNB and the SeNB transmit DRB serial number status and uplink and downlink packet data convergence protocol (PDCP) service data units (SDUs), which are controlled by a respective anchor thereof, to the target eNB via an X2 interface between the source MeNB and the target eNB, thereby ensuring continuity and data lossless of the PDCP data units of each DRB.

In step 7, when the UE successfully accesses the serving cell under the target eNB, the UE sends an RRC connection reconfiguration complete message for acknowledgement, then the target eNB can perform uplink and downlink scheduling of all DRBs and user data transmission on the UE, and the MCG RL in the source MeNB and the SCG RL in the source SeNB are released.

In steps 8 to 10, a path switch procedure related to a core network between the source eNBs and the target eNB is performed, and a user plane channel with the core network is updated.

In steps 11 and 12, the target eNB initiates a UE context release command to the source MeNB and the source SeNB, and context of the UE in the source MeNB and the source SeNB is released.

It can be seen from the above procedure that since only MCG SRB exists, the source MeNB controls the entire handover procedure, and handover command messages are sent to the UE via the MCG SRB; the source SeNB does not actively participate or control the entire handover procedure, and is only passively notified or collaborated.

It can be seen that in the existing art, there is a defect that an RRM processing load of the master node on the UE mobility management is large.

SUMMARY

In view of the above, the present disclosure provides the following solutions.

In a first aspect, embodiments of the present disclosure provide a management method for a mobile handover. The method is applied to a source secondary base station and includes steps described below.

In response to determining to switch a set user equipment (UE) to a target base station, and when the target base station and the source secondary base station are not the same base station, a handover request message is sent to the target base station.

In response to receiving a handover request acknowledgement message sent by the target base station, a handover command message is sent to the UE via an SCG SRB of a source secondary base station side to trigger the UE to perform a random access attempt on a serving cell under the target base station.

In a second aspect, the embodiments of the present disclosure provide a management method for a mobile handover. The method is applied to a source master base station and includes steps described below.

A grant is configured to allow the source secondary base station to enable a function of performing mobile handover management on the set UE, where the configured grant at least includes parameter information about UE wireless connection security control, including an encryption key of a radio bearer and an integrity protection key.

When the source secondary base station determines to switch the set UE to the target base station, and when the target base station and the source secondary base station are not the same base station, a source secondary base station node release request message forwarded by the source secondary base station is received, where the source secondary base station node release request message contains data forwarding address information.

An association relationship with the UE is released according to the source secondary base station node release request message.

UE-related data cached in the source master base station is forwarded via the source secondary base station according to the data forwarding address information.

In a third aspect, the embodiments of the present disclosure provide a management method for a mobile handover. The method is applied to a target base station. When the target base station and the source secondary base station are not the same base station, the method includes steps described below.

A handover request message sent by the source secondary base station is received.

Resource pre-allocation, RRC configuration and context generation in the target base station are performed on the UE according to a parameter in the handover request message.

A handover request acknowledgement message is sent to the source secondary base station, where the handover request acknowledgement message contains an RRC configuration and context in the target base station.

In a fourth aspect, the embodiments of the present disclosure provide a management device for a mobile handover. The device is configured in the source secondary base station and includes a first sending module and a first processing module.

The first sending module is configured to, when the UE is determined to be switched to the target base station, and when the target base station and the source secondary base station are not the same base station, send a handover request message to the target base station.

The first processing module is configured to, in response to receiving a handover request acknowledgement message sent by the target base station, send a handover command message to the UE via an SCG SRB to trigger the UE to perform a random access attempt on a serving cell under the target base station.

In a fifth aspect, the embodiments of the present disclosure provide a management device for a mobile handover. The device is configured in a source master base station and includes a second sending module, a second receiving module and a second processing module.

The second sending module is configured to configure a grant to allow the source secondary base station to enable a function of performing mobile handover management on the set UE, where the configured grant at least includes parameter information about UE wireless connection security control, including an encryption key of a radio bearer and an integrity protection key.

The second receiving module is configured to, when the source secondary base station determines to switch the set UE to the target base station, and when the target base station and the source secondary base station are not the same base station, receive a source secondary base station node release request message forwarded by the source secondary base station, where the source secondary base station node release request message contains data forwarding address information.

The second processing module is configured to release an association relationship with the UE according to the source secondary base station node release request message, and forward cached UE-related data according to the data forwarding address information.

In a sixth aspect, the embodiments of the present disclosure provide a management device for a mobile handover. The device is configured in a target base station. When the target base station and the source secondary base station are not the same base station, the device includes a third receiving module, a third processing module and a third sending module.

The third receiving module is configured to receive a handover request message sent by the source secondary base station.

The third processing module, which is configured to preform resource pre-allocation, RRC configuration and context generation in the target base station on the UE according to a parameter in the handover request message.

The third sending module is configured to send a handover request acknowledgement message to the source secondary base station, where the handover request acknowledgement message contains an RRC configuration and context in the target base station.

In a seventh aspect, the embodiments of the present disclosure provide a management equipment for a mobile handover. The equipment is configured in a source secondary base station and includes a processor, a memory and a communication bus.

The communication bus is configured to implement connection communication between the processor and the memory.

The processor is configured to execute management programs for the mobile handover stored in the memory to implement following steps:

in response to determining to switch a set user equipment (UE) to a target base station, and when the target base station and the source secondary base station are not the same base station, sending a handover request message to the target base station; and in response to receiving a handover request acknowledgement message sent by the target base station, sending a handover command message to the UE via an SCG SRB to trigger the UE to perform a random access attempt on a serving cell under the target base station.

In an eighth aspect, the embodiments of the present disclosure provide a management equipment for a mobile handover. The equipment is configured in a source master base station and includes a processor, a memory and a communication bus.

The communication bus is configured to implement connection communication between the processor and the memory.

The processor is configured to execute management programs for the mobile handover stored in the memory to implement following steps:

configuring a grant to allow a source secondary base station to enable a function of performing mobile handover management on a set UE, where the configured grant at least includes parameter information about UE wireless connection security control, including an encryption key of a radio bearer and an integrity protection key;

when the source secondary base station determines to switch the set UE to the target base station, and when the target base station and the source secondary base station are not the same base station, receiving a source secondary base station node release request message forwarded by the source secondary base station, where the source secondary base station node release request message contains data forwarding address information;

releasing an association relationship with the UE according to the source secondary base station node release request message; and forwarding cached UE-related data via the source secondary base station according to the data forwarding address information.

In a ninth aspect, the embodiments of the present disclosure provide a storage medium. The storage medium is configured to store one or more programs executable by one or more processors to implement following steps:

when the set UE is determined to be switched to the target base station, and when the target base station and the source secondary base station are not the same base station, sending a handover request message to the target base station; and in response to receiving a handover request acknowledgement message sent by the target base station, sending a handover command message to the UE via an SCG SRB to trigger the UE to perform a random access attempt on a serving cell under the target base station.

In a tenth aspect, the embodiments of the present disclosure provide a storage medium. The storage medium is configured to store one or more programs executable by one or more processors to implement following steps:

configuring a grant to allow the source secondary base station to enable a function of performing mobile handover management on the set UE;

when the source secondary base station determines to switch the set UE to the target base station, and when the target base station and the source secondary base station are not the same base station, receiving a source secondary base station node release request message forwarded by the source secondary base station, where the source secondary base station node release request message contains data forwarding address information;

releasing an association relationship with the UE according to the source secondary base station node release request message; and forwarding UE-related data cached in the source master base station via the source secondary base station according to the data forwarding address information.

The above technical solutions provide a management method, device, equipment and storage medium for a mobile handover. In the embodiments of the present disclosure, in the 5G new radio and DC between 4G heterogeneous systems (5G NR and LTE DC) configuration operations, the secondary node (SN) side is allowed to independently generate its own RRC protocol data unit (PDU) and independently configure a dedicated SCG SRB. These changes can make the UE mobility management under the NR or LTE DC configuration operations different from the UE mobility management under the conventional LTE DC, and can also make the secondary node partly participate in the handover management of the UE, thereby reducing signaling overhead and data interruption delay during the entire handover process, and reducing an RRM processing load of the master node related to the UE mobility management, such as an RRM measurement algorithm, handover execution, and the like.

Compared with the conventional LTE DC handover procedure, in the embodiments of the present disclosure, on the premise of source MN configuration and grant, the source SN can replace the source MN to a certain extent to control a potential cross-radio access technology (RAT) base station handover procedure of the UE, and in the entire procedure, the total number of messages is the same, but the embodiments of the present disclosure have advantages in following aspects:

1. in a macro coverage area of the source MN, there are multiple UE terminals to be faced with, and when the source MN delegates handover management tasks of part of UEs to the source SN to execute, the source SN can share RRM mobility management loads of the source MN on part of UEs;

2. when no directly-connected Xn interface is between the source MN and the target base station but a directly-connected Xn interface is between the source SN and the target base station, the handover manner mainly controlled by the source SN can avoid a situation in which the source MN is forced to go through a large handover procedure between an NG-based base station and a core network, and since an Xn-based small handover procedure is faster than the NG-based large handover procedure, UE service interruption experience is short, and continuity performance of the PDCP data unit is better;

3. when the target base station and the source MN are heterogeneous and in different RAT types but the target base station and the source SN are in the same RAT type, at this time, the source SN can keep consistency in selection of a serving cell in the target base station and management of target RRC configuration, resource reservation and context of the UE; and 4. since wireless coverage of the SN is smaller than that of the MN generally, robustness of the SCG SRB to transmit handover command messages is stronger than that of the MCG SRB to transmit handover messages generally, thereby reducing a possibility of handover failure.

DETAILED DESCRIPTION

Objects, technical solutions and advantages of the present disclosure will be clearer from a detailed description of embodiments of the present disclosure in conjunction with the drawings. It is to be noted that if not in collision, the embodiments and features therein in the present application may be combined with each other.

In an early stage of the introduction of a 5G new radio base station (5G GNB of the NR), the operator mainly depends on evolved packet core (EPC), a lot of LTE eNBs are covered in the existing network, and the GNB of the NR may not be able to independently network or work in a standalone manner, and for example, the GNB of the NR does not support an NG interface with the 5G core network (5GC) or cannot support a new radio system broadcasting (NR SI) message. Therefore, a 5G gNB under a non-independent network configuration can only operate tight interworking via the LTE and the NR, which is also referred to as an EN-DC working manner. This deployment manner is called Option3 or Option3a or Option3x. The Option3 or Option3a or Option3x corresponds to three different DRB types: an MCG split bearer, an SCG bearer and an SCG split bearer respectively.

Figure 1:
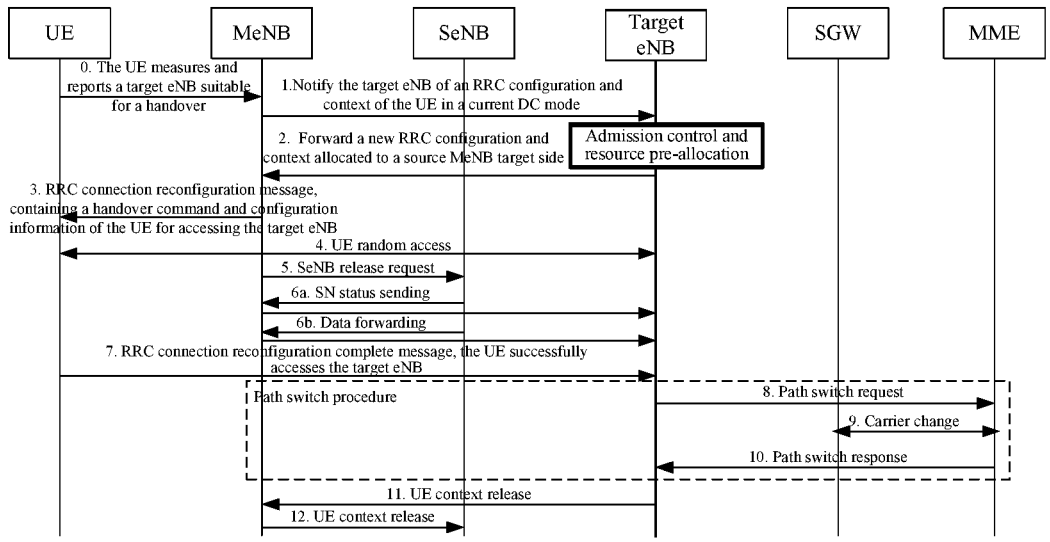
FIG. 1 is a flowchart illustrating a cross-base station handover on an MeNB in a conventional LTE DC working mode.
Figure 2:
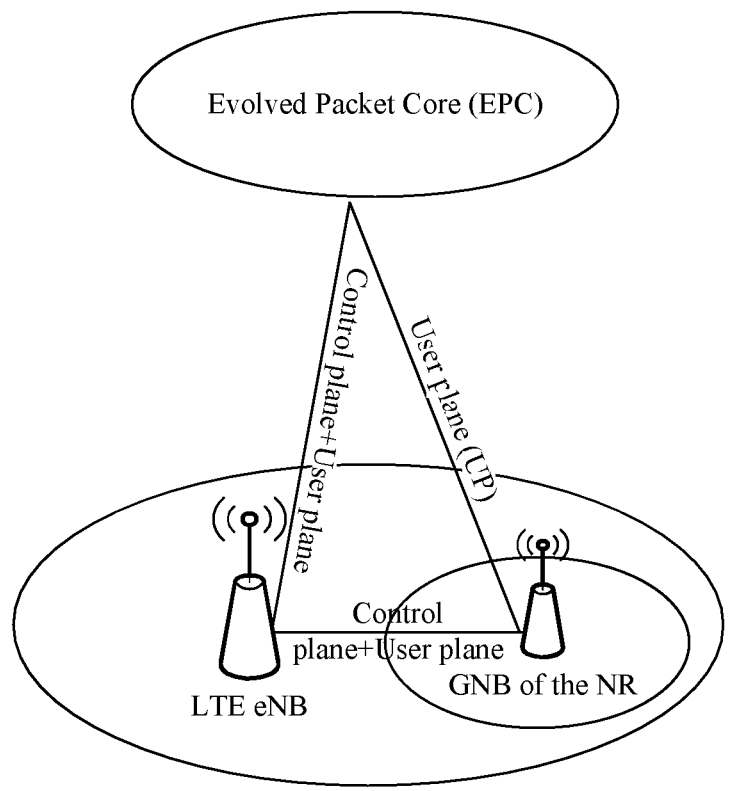
FIG. 2 is a schematic diagram of an Option3 or Option3a or Option3x network deployment manner according to an embodiment of the present disclosure.

With the maturity of the gNB functions of the NR and the completeness of related network conditions, the Option3 or Option3a or Option3x in FIG. 2, for example, supports the NG interface with the 5GC and the NR SI messages, and at the same time, the operator also is in transition from the EPC to the new core network, i.e., the 5GC. At this time, the gNB of the NR can independently work in the standalone manner. Such a gNB independent networking deployment manner is called Option2. At the same time, the operator also updates a large number of eNBs into enhanced LTE eNBs (eLTE eNBs). Therefore, the eLTE eNB can be connected to the 5GC and controlled in the same way as the gNB of the NR is, and the eLTE eNB and gNB can also be connected via a new Xn interface. Such an eLTE eNB independent deployment manner is called Option5. The Option2 or the Option5 does not belong to LTE and NR DC scenarios, and thus is not mainly described hereinafter.

Figure 3A:
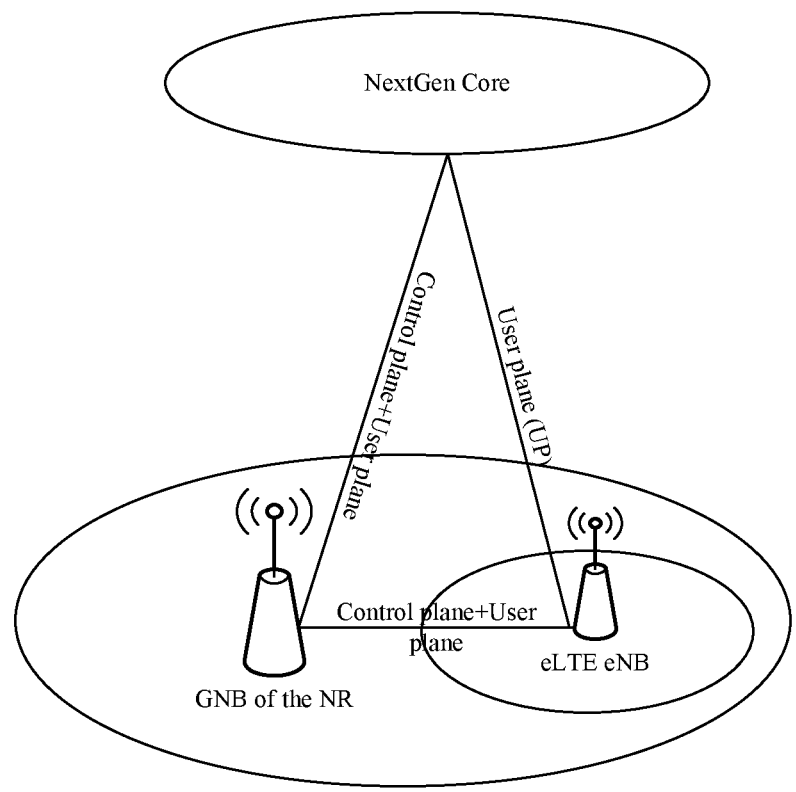
FIG. 3A is a schematic diagram of an Option4 or Option4a network deployment manner according to an embodiment of the present disclosure.
Figure 3B:
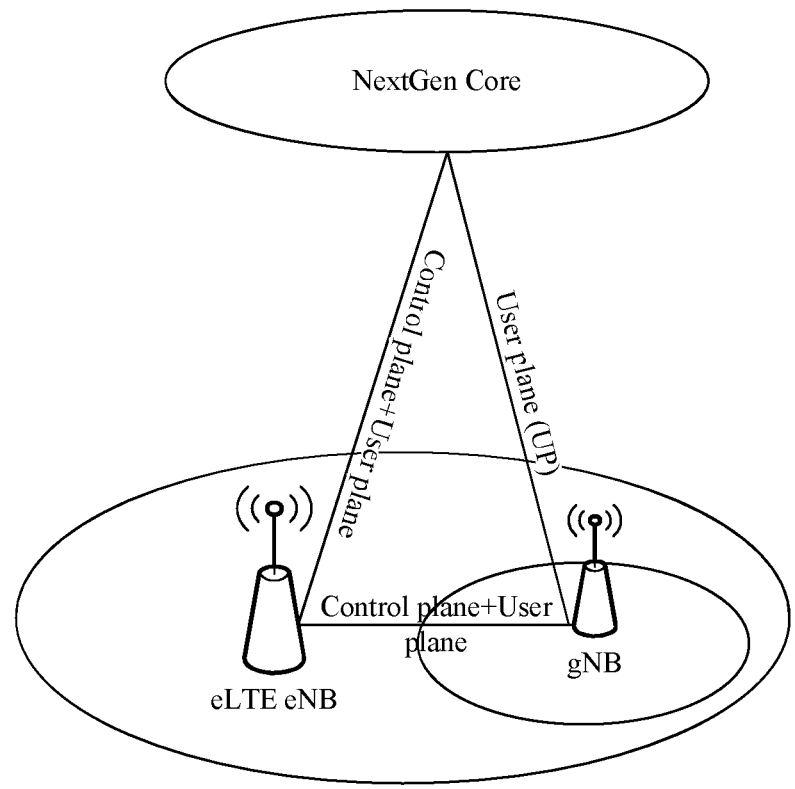
FIG. 3B is a schematic diagram of an Option7 or Option7a network deployment manner according to an embodiment of the present disclosure.

The gNB of the NR and the eLTE eNB can also perform LTE and NR interworking. As shown in FIG. 3A, when a gNB is used as a master node and an eLTE eNB is used as secondary node, such a deployment manner is called Option4 or Option4a, which is also referred to as an NE-DC working manner. On the contrary, as shown in FIG. 3A, when an eLTE eNB is used as a master node and a gNB is used as secondary node, such a deployment manner is called Option7 or Option7a or Option7x, which is also referred to as an NGEN-DC working manner. Similar to the Option3 series in FIG. 2, sub-series in the Option4 or Option7 correspond to different types respectively. Therefore, the LTE and NR inter-heterogeneous dual-connect or multi-connectivity scenario includes three main types, i.e., the Option3 or Option3a or Option3x, the Option4 or Option4a, and the Option7 or Option7a or Option7x. Since the Option3 or Option3a or Option3x is connected to the EPC, it adopts the old LTE-based radio access bearer based Quality of Service (E-RAB Based QOS) model, and is still regarded as a 4G heterogeneous double- or multi-connectivity scenario. Since the Option4 or Option4a and the Option7 or Option7a or Option7x are connected to the 5GC, they adopt a new PDU session based QOS model is adopted, and are regarded as 5G heterogeneous dual-connectivityion or multi-connectivityion scenarios. On the basis of the above basic double connect, more connections can be delivered, that is, the UE is wirelessly connected to more gNBs and eNBs at the same time, and there are more RLs for data transmission of the control plane and the user plane.

For the LTE and NR inter-heterogeneous DC or MC, besides the MCG SRB on the master node side, the dedicated SRB on the secondary node side (referred to as the SCG SRB) can also be configured between the base station and the UE. The SCG SRB can be used for directly transmitting RRC uplink and downlink messages only related to the secondary node side. Therefore, any RRC-related configuration operation independently generated on the secondary node can be directly transmitted via the SCG SRB to exchange RRC messages with the UE, and there is no need to use the MCG SRB on the MN side.

Figure 4A:
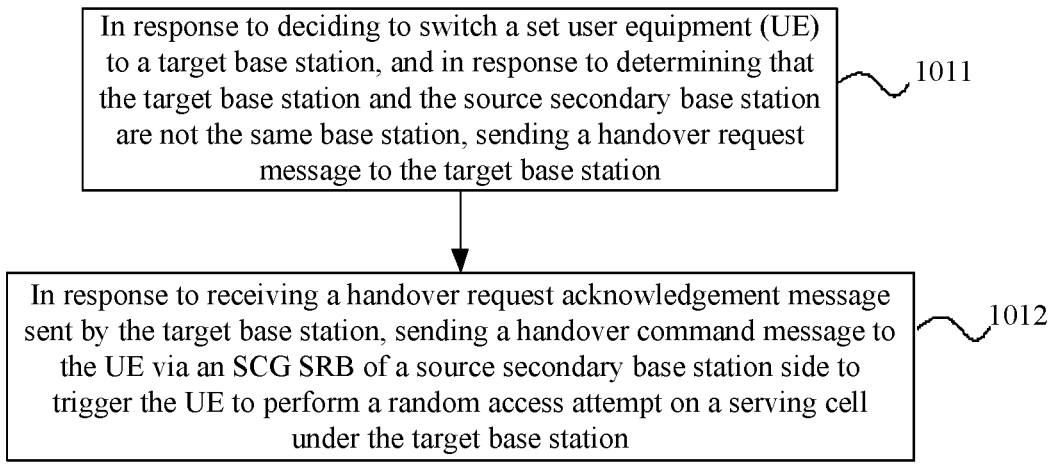
FIG. 4A is a flowchart of a management method of a mobile handover according to a first embodiment of the present disclosure.

Referring to FIG. 4A, it is a flowchart of a management method of a mobile handover according to a first embodiment of the present disclosure.

This embodiment is applicable to a case in which a target base station and a source MN are heterogeneous and in different RAT types in a sub-series scenario of the Option4 or Option7 of the NR and the LTE DC, i.e., a cross-base station handover scenario where the source MN is a gNB or a central unit (CU) of a gNB and the target base station is an eLTE eNB, or a cross-base station handover scenario where the source MN is an eLTE eNB or a CU of an eLTE eNB and the target base station is a gNB. At the same time, this embodiment is also applicable to a case in which the target base station and the source MN are homogeneous and in the same RAT type in a sub-series scenario of the Option4 or Option7 of the NR and the LTE DC, i.e., a cross-base station handover scenario where the source MN is a gNB or a CU of a gNB and the target base station is also a gNB, or a cross-base station handover scenario where the source MN is an eLTE eNB or a CU of an eLTE eNB and the target base station is also an eLTE eNB.

The management method for a mobile handover in this embodiment is applied to a source secondary base station. The method includes steps 1011 and 1012 described below.

In step 1101, in response to determining to switch a set user equipment (UE) to a target base station, and when the target base station and the source secondary base station are not the same base station, a handover request message is sent to the target base station.

In step 1102, in response to receiving a handover request acknowledgement message sent by the target base station, a handover command message is sent to the UE via an SCG SRB of a source secondary base station side to trigger the UE to perform a random access attempt on a serving cell under the target base station.

In this embodiment, the target base station and the source secondary base station are heterogeneous or inter-system base stations.

The heterogeneous or inter-system base stations are mobile network base stations composed of different RAT formats or different physical implementations.

In this embodiment, the step in which the set UE is determined to be switched to the target base station includes following steps.

After a configured grant of a source master base station is obtained and a mobile handover management function is enabled, RRM report information obtained after the UE performs RRM measurement on an adjacent base station or serving cell is received, where the configured grant at least includes parameter information about UE wireless connection security control, including an encryption key of a radio bearer and/or an integrity protection key.

In response to obtaining a base station suitable for handover according to the RRM report information, the set UE is determined to be switched to the target base station.

In this embodiment, the step in which the RRM report information obtained by the UE is received includes one of following steps.

RRM report information reported by the UE via the SCG SRB is received.

RRM report information that is first reported to the source master base station via an MCG SRB of a source master base station side and then delivered by the source master base station is received.

In this embodiment, the handover request message includes an RRC configuration and context of the UE in a current dual-connectivity or multi-connectivity mode; and/or the handover request acknowledgement message includes an RRC configuration and context of the UE in the target base station.

In this embodiment, types of base stations included in the current dual-connectivity or multi-connectivity mode include a new radio base station and/or a long term evolution base station.

In this embodiment, the method further includes following steps. A source secondary base station node release request message sent by the target base station is received, and the source secondary base station node release request message is forwarded to the source master base station, where the source secondary base station node release request message contains data forwarding address information.

An association relationship between the source secondary base station and the UE is released according to the source secondary base station node release request message, and UE-related data cached in the source secondary base station is forwarded according to the data forwarding address information.

In this embodiment, the method further includes a following step. All DRB series number status and PDCP SDUs, which are controlled by a DRB controlled by a source secondary base station anchor, are delivered to the target base station.

In this embodiment, the DRB controlled by the source secondary base station anchor includes an SCG bearer or an SCG split bearer.

In this embodiment, the method further includes a step in which a radio link between the source secondary base station and the UE is released.

In this embodiment, the method further includes a step in which a UE context release command initiated by the target base station is received, and context of the UE in the source secondary base station is released.

In this embodiment, the method further includes a step in which when the target base station and the source secondary base station are the same base station, in response to receiving a handover request message sent by the source master base station, an RRC connection reestablishment message or an RRC connection reconfiguration message is sent to the UE via the SCG SRB, where the RRC connection reestablishment message or the RRC connection reconfiguration message contains a handover command.

In this embodiment, the RRC connection reestablishment message or the RRC connection reconfiguration message further includes an RRC configuration and context of the UE in the target base station, and/or an indication indicating whether the UE needs to re-perform random access.

In this embodiment, the method further includes steps as follows: a source master base station node release request message is sent to the source master base station, and an association relationship between the source master base station and the UE is required releasing, where the source master base station node release request message contains data forwarding address information.

In this embodiment, the method further includes a step in which an RRC connection reconfiguration complete message sent when the UE successfully accesses a serving cell under the target base station by the UE is received, and uplink and downlink scheduling of all DRBs and data transmission are performed on the UE.

In this embodiment, the method further includes a step in which a path switch related to a core network is performed, and a user plane channel with the core network is updated.

In this embodiment, the method further includes steps as follows: a UE context release command is initiated to the source master base station, and context of the UE in the source master base station is required releasing.

Figure 4B:
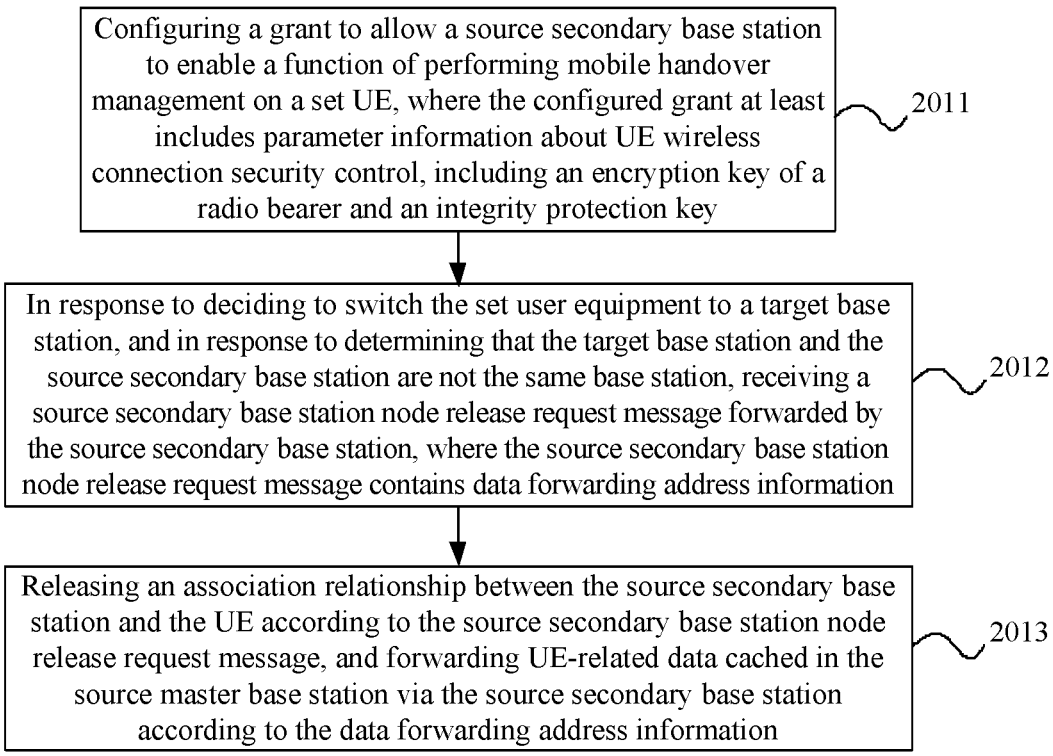
FIG. 4B is a flowchart of a management method of a mobile handover according to a second embodiment of the present disclosure.

Referring to FIG. 4B, FIG. 4B is a flowchart of a management method of a mobile handover according to a second embodiment of the present disclosure. The management method for a mobile handover in this embodiment is applied to a source master base station and includes steps 2011, 2012 and 2013 described below.

In step 2011, a grant is configured to allow a source secondary base station to enable a function of performing mobile handover management on a set UE, where the configured grant at least includes parameter information about UE wireless connection security control, including an encryption key of a radio bearer and an integrity protection key.

In step 2012, when the source secondary base station determines to switch the set UE to a target base station, and when the target base station and the source secondary base station are not the same base station, a source secondary base station node release request message forwarded by the source secondary base station is received, where the source secondary base station node release request message contains data forwarding address information.

In step 2013, an association relationship between the source secondary base station and the UE is released according to the source secondary base station node release request message, and UE-related data cached in the source master base station is forwarded via the source secondary base station according to the data forwarding address information.

In this embodiment, the method further includes a step in which a handover request acknowledgement message forwarded by the source secondary base station and sent by the target base station is received, where the handover request acknowledgement message includes an RRC configuration and context of the UE in the target base station.

In this embodiment, the method further includes a step in which RRM report information reported by the UE is received via an MCG SRB, and the RRM report information is delivered to the source secondary base station.

In this embodiment, the method further includes a step in which all DRB series number status and PDCP SDUs, which are controlled by a DRB controlled by a source master base station anchor, are forwarded to the target base station via the source secondary base station.

In this embodiment, the method further includes a step in which a UE context release command forwarded by the source secondary base station and initiated by the target base station is received, and all context of the UE in the source master base station is released.

In this embodiment, the method further includes steps as follows: when the target base station and the source secondary base station is the same base station, RRM report information of the UE is obtained, and a handover request message is sent to the target base station according to the RRM report information; a source master base station node release request message sent by the target base station is received, where the source master base station node release request message includes data forwarding address information; an association relationship with the UE is released according to the source master base station node release request message; and UE-related data cached in the source master base station is forwarded according to the data forwarding address information.

In this embodiment, the method further includes a step in which all DRB series number status and PDCP SDUs, which are controlled by a DRB controlled by a source master base station anchor, are delivered to the target base station.

In this embodiment, the method further includes a step in which a radio link between the source master base station and the UE is released.

Figure 4C:
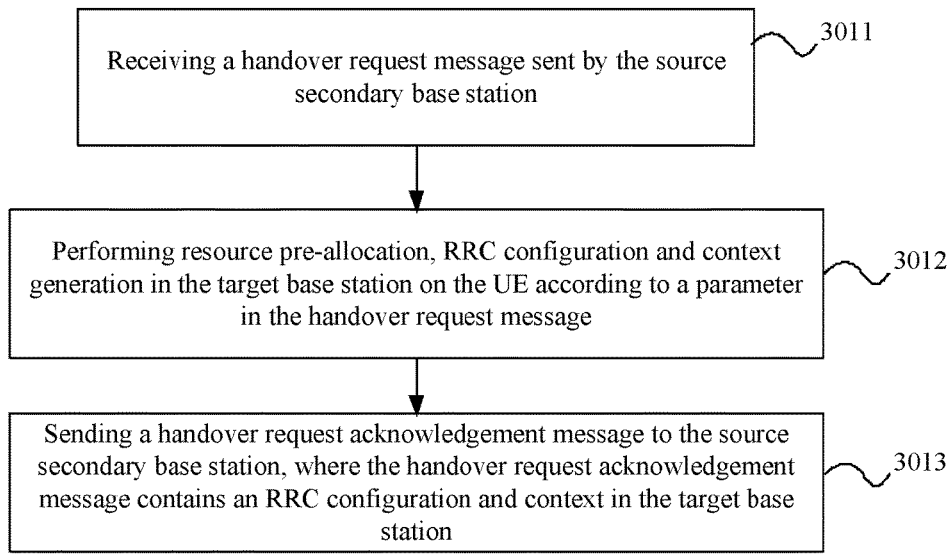
FIG. 4C is a flowchart of a management method of a mobile handover according to a third embodiment of the present disclosure.

Referring to FIG. 4C, it is a flowchart of a management method of a mobile handover according to a third embodiment of the present disclosure. The management method for a mobile handover in this embodiment is applied to a target base station. The target base station and a source secondary base station are not the same base station and the method includes steps 3011, 3012 3013 described below.

In step 3011, a handover request message sent by the source secondary base station is received.

In step 3012, resource pre-allocation, RRC configuration and context generation in the target base station are performed on the UE according to a parameter in the handover request message.

In step 3013, a handover request acknowledgement message is sent to the source secondary base station, where the handover request acknowledgement message contains an RRC configuration and context in the target base station.

In this embodiment, the handover request message includes an RRC configuration and context of the UE in a current dual-connectivity or multi-connectivity mode.

In this embodiment, the method further includes a step in which a source secondary base station node release request message is sent to the source secondary base station, where the source secondary base station node release request message contains data forwarding address information.

In this embodiment, the method further includes steps as follows: cached UE-related data sent by the source secondary base station is received according to the data forwarding address information, and UE-related data cached by a source master base station and forwarded by the source secondary base station is received.

In this embodiment, the method further includes steps as follows: all DRB series number status and PDCP SDUs, which are sent by source secondary base station anchor control and controlled by a DRB of the source secondary base station are received, and all DRB series number status and PDCP SDUs, which are forwarded by the source secondary base station and controlled by a DRB of the source master base station are received.

In this embodiment, the method further includes a step in which an RRC connection reconfiguration complete message sent when the UE successfully accesses a serving cell under the target base station by the UE is received, and uplink and downlink scheduling of all DRBs and data transmission are performed on the UE.

In this embodiment, the method further includes a step in which a path switch related to a core network is performed, and a user plane channel with the core network is updated.

The path switch related to the core network is triggered and executed by the target base station, that is, a new core network path is established and the old core network path is released.

In this embodiment, the method further includes steps as follows: a UE context release command is sent to the source master base station, and all context of the UE in the source master base station and the source secondary base station is required releasing.

The embodiments of the present disclosure further provide a management device for a mobile handover. The device is configured in a source secondary base station and includes a sending module and a processing module. The sending module is configured to, in response to determining to switch a set UE to a target base station, and when the target base station and the source secondary base station are not the same base station, send a handover request message to the target base station.

The processing module is configured to, in response to receiving a handover request acknowledgement message sent by the target base station, send a handover command message to the UE via an SCG SRB to trigger the UE to perform a random access attempt on a serving cell under the target base station.

In this embodiment, the device further includes: a receiving module, which is configured to receive a source secondary base station node release request message sent by the target base station, where the source secondary base station node release request message contains data forwarding address information;

a forwarding module, which is configured to forward the source secondary base station node release request message to a source master base station; and correspondingly, the processing module is further configured to release an association relationship between the source secondary base station and the UE according to the source secondary base station node release request message, and forward UE-related data cached in the source secondary base station according to the data forwarding address information.

In this embodiment, the sending module is further configured to deliver all DRB series number status and PDCP SDUs, which are controlled by a DRB controlled by a source secondary base station anchor, to the target base station.

In this embodiment, the processing module is further configured to release a radio link between the source secondary base station and the UE.

In this embodiment, the receiving module is further configured to receive a UE context release command initiated by the target base station; and the processing module is further configured to release context of the UE in the source secondary base station according to the UE context release command.

In this embodiment, the receiving module is further configured to, when the target base station and the source secondary base station are the same base station, receive a handover request message sent by the source master base station; and the sending module is further configured to send an RRC connection reestablishment message or an RRC connection reconfiguration message to the UE via the SCG SRB, where the RRC connection reestablishment message or the RRC connection reconfiguration message contains a handover command.

In this embodiment, the RRC connection reestablishment message or the RRC connection reconfiguration message sent by the sending module further includes an RRC configuration and context of the UE in the target base station, and/or an indication indicating whether the UE needs to re-perform random access.

In this embodiment, the sending module is further configured to send a source master base station node release request message to the source master base station, and require releasing an association relationship between the source master base station and the UE, where the source master base station node release request message contains data forwarding address information.

In this embodiment, the receiving module is further configured to receive an RRC connection reconfiguration complete message sent when the UE successfully accesses the serving cell under the target base station by the UE; and the processing module is further configured to perform uplink and downlink scheduling of all DRBs and data transmission on the UE.

The embodiments of the present disclosure further provide a management device for a mobile handover. The device is configured in a source master base station and includes a sending module, a receiving module and a processing module.

The sending module is configured to configure a grant to allow a source secondary base station to enable a function of performing mobile handover management on a set UE, where the configured grant at least includes parameter information about UE wireless connection security control, including an encryption key of a radio bearer and an integrity protection key.

The receiving module is configured to, when the source secondary base station determines to switch the set UE to the target base station, and when the target base station and the source secondary base station are not the same base station, receive a source secondary base station node release request message forwarded by the source secondary base station, where the source secondary base station node release request message contains data forwarding address information.

The processing module is configured to release an association relationship with the UE according to the source secondary base station node release request message, and forward cached UE-related data according to the data forwarding address information.

In this embodiment, the receiving module is further configured to, when the target base station and the source secondary base station are the same base station, obtain RRM report information of the UE;

the sending module is further configured to send a handover request message to the target base station according to the RRM report information;

the receiving module is further configured to receive a source master base station node release request message sent by the target base station, where the source master base station node release request message includes data forwarding address information; and the processing module is further configured to release the association relationship with the UE according to the source master base station node release request message, and forward the cached UE-related data according to the data forwarding address information.

The embodiments of the present disclosure further provide a management device for a mobile handover. The device is applied to a target base station. When the target base station and a source secondary base station are not the same base station, the device includes a receiving module, a processing module and a sending module.

The receiving module is configured to receive a handover request message sent by the source secondary base station.

The processing module is configured to preform resource pre-allocation, RRC configuration and context generation in the target base station on the UE according to a parameter in the handover request message.

The sending module is configured to send a handover request acknowledgement message to the source secondary base station, where the handover request acknowledgement message contains an RRC configuration and context in the target base station.

In this embodiment, the sending module is further configured to send a source secondary base station node release request message to the source secondary base station, where the source secondary base station node release request message contains data forwarding address information.

In this embodiment, the receiving module is further configured to receive all DRB series number status and PDCP SDUs, which are sent by source secondary base station anchor control and controlled by a DRB of the source secondary base station.

In this embodiment, the receiving module is further configured to receive an RRC connection reconfiguration complete message sent when the UE successfully accesses the serving cell under the target base station by the UE; and the processing module is further configured to perform uplink and downlink scheduling of all DRBs and data transmission on the UE.

In this embodiment, the processing module is further configured to perform a path switch related to a core network, and update a user plane channel with the core network.

In this embodiment, the sending module is further configured to send a UE context release command to a source master base station and the source secondary base station, and require releasing all context of the UE in the source master base station and the source secondary base station.

Overall, the management method for a mobile handover in the embodiments of the present disclosure includes steps 0 to 7 described below.

In step 0, the source MN configures a grant and enables a mobile handover management function performed by the source SN on the set UE via a new XnAP interface procedure, and the source SN controls a handover procedure of a cross-heterogeneous/inter-system RAT base station (the target base station is in a same RAT domain relationship with the SN) of the set UE. The UE directly reports RRM measurement report information to the source SN via an SCG SRB, or the UE first reports the RRM measurement report information to the source MN via an MCG SRB and then the source MN delivers the RRM measurement report information to the source SN via an Xn interface message as a handover judgement reference.

In step 1, based on the RRM measurement report information of the UE, when the source MN or the source SN (which may be a gNB, an eLTE eNB or a CU thereof) determines to perform the heterogeneous cross-RAT handover, the source SN sends a handover request message (HO Request) by using the Xn interface between the source SN and the target base station (the target base station is in the same RAT domain relationship with the SN), and notifies the target base station of the RRC configuration and context of the UE in the current NR and LTE DC dual-connectivity mode.

In step 2, the target base station sends a handover request acknowledgement message (e.g., HO Request ACK) to the source SN via the Xn interface to notify the source SN, and/or sends the handover request acknowledgement message to the source MN at the same time to notify the source MN of the acknowledgement of the handover request as well as a new RRC configuration and context of the UE in the target base station.

In step 3, the source SN sends a handover command message (e.g., RRC connection reconfiguration) to the UE via the SCG SRB to trigger the UE to perform a random access attempt on a serving cell under the target base station.

In step 4, the UE leaves all serving cells in the source MN and the source SN, disconnects an MCG RL, an SCG RL and related data transmission, and performs a random access attempt on the serving cell under the target base station.

In step 5, the source SN sends a source secondary base station node release request message (e.g., SN Release Request) to the source MN via the Xn interface, and actively requires releasing an association relationship between the source SN and the UE and an association relationship between the source MN and the UE, where the source secondary base station node release request message contains data forwarding address information.

In step 6, the source MN and the source SN transmit all DRB serial number status and uplink and downlink PDCP SDUs controlled by a respective anchor thereof to the target base station through the Xn interface between the source SN and the target base station, thereby ensuring continuity and data lossless of the PDCP data units of each DRB.

In step 7, when the UE successfully accesses the serving cell under the target base station, the UE sends an RRC connection reconfiguration complete message to the target base station for acknowledgement, and then the target base station can perform uplink and downlink scheduling of all DRBs and data transmission on the UE, and the MCG RL in the source MN and the SCG RL in the source SN are released.

In this embodiment, the method further includes steps 8 to 12 described below.

In steps 8 to 10, a path switch procedure related to a core network between the source base stations and the target base station is performed, and a user plane channel with the core network is updated.

In steps 11 and 12, the target base station initiates a UE context release command to the source SN and the source MN, and releases context of the UE in the source SN and the source MN.

Compared with the conventional LTE DC handover procedure, in the method provided by this embodiment, on the premise of source MN configuration and grant, the source SN can replace the source MN to a certain extent to fully control a potential cross-RAT base station handover procedure of the UE, and in the entire procedure, the total number of messages is the same, but the method has following advantages:

1. since there are multiple UE terminals to be faced with in the entire macro coverage area of the source MN, the source SN can share RRM mobility management loads of the source MN on part of UEs, because the source MN delegates handover management tasks of part of UEs to the source SN to execute;

2. if no directly-connected Xn interface is between the source MN and the target base station but a directly-connected Xn interface is between the source SN and the target base station, the handover manner mainly controlled by the source SN can avoid a situation in which the source MN is forced to go through a large handover procedure between an NG-based base station and a core network, and since an Xn-based small handover procedure is faster than the NG-based large handover procedure, UE service interruption experience is short, and continuity performance of the PDCP data unit is better;

3. since the target base station and the source MN are heterogeneous and in different RAT types but the target base station and the source SN are in the same RAT type, at this time, the source SN can keep consistency in selection of the serving cell in the target base station and management of target RRC configuration, resource reservation and context of the UE; and 4. since wireless coverage of the SN is smaller than that of the MN generally, generally, robustness of the SCG SRB to transmit handover command messages is stronger than that of the MCG SRB to transmit handover messages, thereby reducing a possibility of handover failure.

The technical solutions of the present disclosure will be described below in detail through examples in specific applications.

Example One

Figure 5:
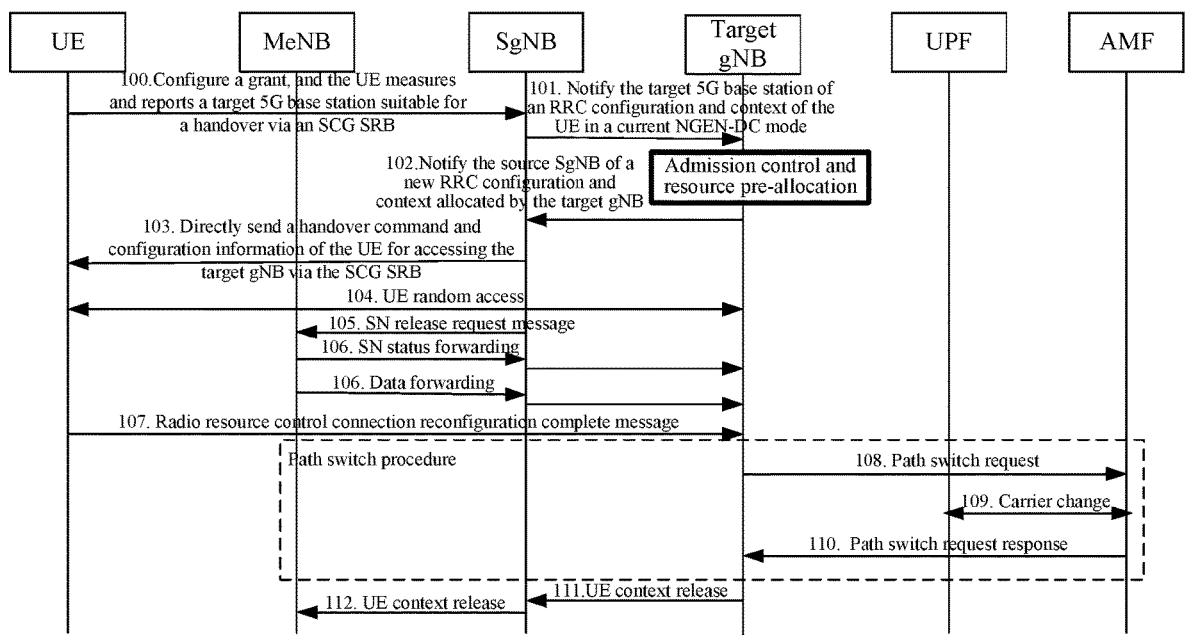
FIG. 5 is a flowchart of a cross-RAT base station handover in a deployment scenario of NGEN-DC Option7 series according to an example one of the present disclosure.

As shown in FIG. 5, in a deployment scenario of the NGEN-DC Option7 series, a source eLTE MeNB is connected under an access management function (AMF) and a user plane function (UPF) of a 5G core network element, an inter-frequency source secondary 5G base station (SgNB) and the source MeNB are connected to each other via an Xn interface in the wireless macro coverage area of the source MeNB, and a certain specific UE has been configured to be in the NGEN-DC Option7 working mode. In addition, a target gNB is adjacent to the source SgNB and is directly connected to the source SgNB via an Xn interface, but there is no Xn interface to directly connect the target gNB and the source MeNB. The source MeNB and the source SgNB support related content of the present disclosure.

The management method for a mobile handover in this example includes steps 100 to 112 described below.

In step 100, the source MeNB configures a grant to allow the source SgNB to control a handover procedure of a cross-heterogeneous or cross-inter-system RAT base station of the specific UE (in the NGEN-DC Option7 working mode) via an XnAP interface procedure message; the UE can directly report an RRM measurement result to the source SgNB via an SCG SRB as a handover judgment reference.

In step 101, based on RRM measurement report information of the UE, a handover request message (HO Request) is sent between the source SgNB and the target gNB via the Xn interface, and the source SgNB notifies the target gNB of an RRC configuration and context of the UE in the NGEN-DC Option7 mode.

In step 102, the target gNB directly sends a handover request acknowledgement message (HO Request ACK) to the source SgNB via the Xn interface to notify the source SgNB of a new RRC configuration and context of the UE in the target gNB.

In step 103, the source SgNB directly sends a handover command message (e.g., RRC connection reconfiguration) to the UE via the SCG SRB to trigger the UE to perform a random access attempt on a certain serving cell under the target gNB.

In step 104, the UE leaves all serving cells in the source MeNB and the source SgNB, and performs the random access attempt on the certain serving cell under the target gNB.

In step 105, the source SgNB directly sends a source secondary base station node release request message (SN Release Request) to the source MeNB via the Xn interface, and actively requires releasing an association relationship between the source SgNB and the UE and an association relationship between the source MeNB and the UE, where the source secondary base station node release request message contains data forwarding address information.

In step 106, the source SgNB and the source MeNB directly transmit all DRB serial number status and uplink and downlink PDCP SDUs controlled by a respective anchor thereof to the target gNB via the Xn interface between the source SgNB and the target gNB, ensuring continuity and data lossless of PDCP data units that are not successfully transmitted.

In step 107, when the UE successfully accesses the certain serving cell under the target gNB, the UE sends an RRC connection reconfiguration complete message for acknowledgement, and then the target gNB can perform uplink and downlink scheduling of all DRBs and data transmission on the UE.

In steps 108 to 110, path switch procedures between the source MeNBs and the target gNB and between the source SgNB and the target gNB are performed, and a user plane channel between the target gNB and the UPF is updated.

In steps 111 and 112, the target gNB initiates a UE context release command to the source MeNB and the source SgNB, and context of the UE in the source MeNB and the source SgNB is released.

Example 2

Figure 6:
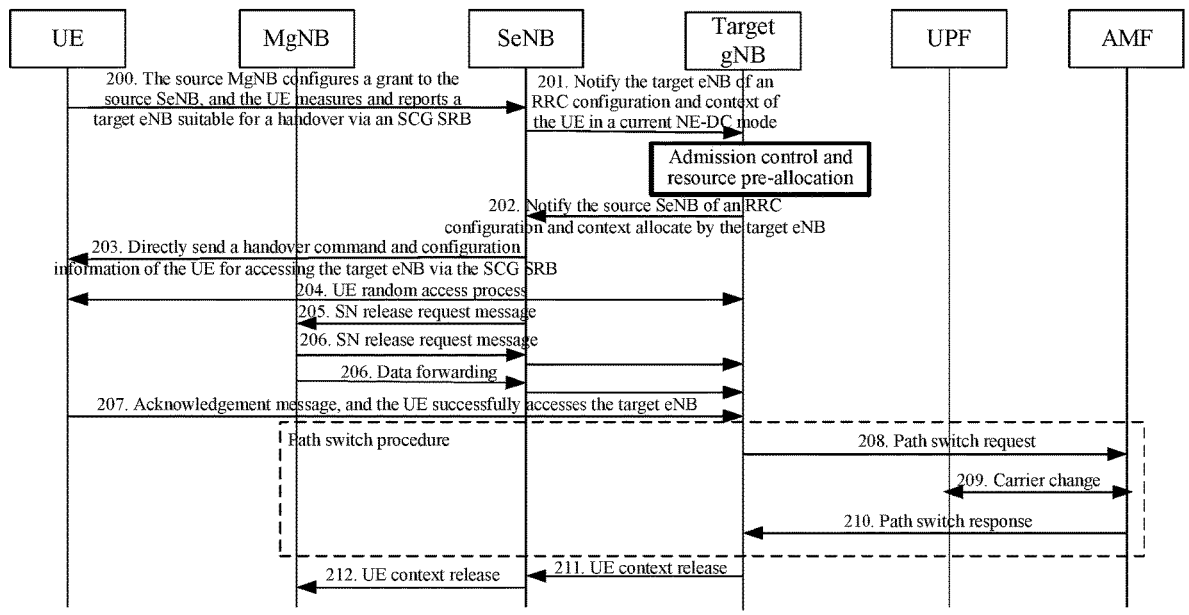
FIG. 6 is a flowchart of an example two of the present disclosure.

As shown in FIG. 6, in a deployment scenario of the NE-DC Option4 series, a source master 5G base station (MgNB) is connected on an AMF and a UPF of a 5G core network element, an inter-frequency source secondary evolved base station (eLTE SeNB) and the source MgNB are connected to each other via an Xn interface in the wireless macro coverage area of the source MgNB, and a certain specific UE has been configured to be in the NE-DC Option4 working mode. A target eLTE eNB is adjacent to the source SeNB and is directly connected to the source SeNB via an Xn interface, but there is no Xn interface to directly connect the target eLTE eNB and the source MgNB. The source MgNB and the source SeNB support the related content of the present disclosure.

In step 200, the source MgNB configures a grant to allow the source SeNB to fully control a handover procedure of a cross-heterogeneous or cross-inter-system RAT base station of the specific UE (in the NE-DC Option4 working mode) via an XnAP interface procedure message; the UE can directly report an RRM measurement result to the source SeNB via an SCG SRB as a handover judgment reference.

In step 201, based on RRM measurement report information of the UE, a handover request message (HO Request) is sent between the source SgNB delegated by the source MgNB and the target eNB via the Xn interface, and the source SeNB notifies the target eNB of an RRC configuration and context of the UE in the NE-DC Option4 mode.

In step 202, the target eNB directly sends a handover request acknowledgement message (HO Request ACK) to the source SeNB via the Xn interface to notify the source SgNB of a new RRC configuration and context of the UE in the target eNB.

In step 203, the source SeNB directly sends a handover command message (e.g., RRC connection reconfiguration) to the UE via the SCG SRB to trigger the UE to perform a random access attempt on a serving cell under the target eNB.

In step 204, the UE leaves all serving cells in the source MgNB and the source SeNB, and performs the random access attempt on the serving cell under the target eNB.

In step 205, the source SeNB directly sends a source secondary base station node release request message (SN Release Request) to the source MgNB via the Xn interface, and actively requires releasing an association relationship between the source SeNB and the UE and an association relationship between the source MgNB and the UE, where the source secondary base station node release request message contains data forwarding address information.

In step 206, the source SeNB and the source MgNB directly transmit all DRB serial number status and uplink and downlink PDCP SDUs controlled by a respective anchor thereof to the target eNB via the Xn interface between the source SeNB and the target eNB, ensuring continuity and data lossless of PDCP data units that are not successfully transmitted.

In step 207, when the UE successfully accesses the certain serving cell under the target eNB, the UE sends an RRC connection reconfiguration complete message for acknowledgement, and then the target eNB can perform uplink and downlink scheduling of all DRBs and data transmission on the UE.

In steps 208 to 210, path switch procedures between the source MgNBs and the target eNB and between the source SeNB and the target eNB are performed, and a user plane channel between the target eNB and the UPF is updated.

In steps 211 and 212, the target eNB initiates a UE context release command to the source MgNB and the source SeNB, and context of the UE in the source MgNB and the source SeNB is released.

Example Three

Figure 7:
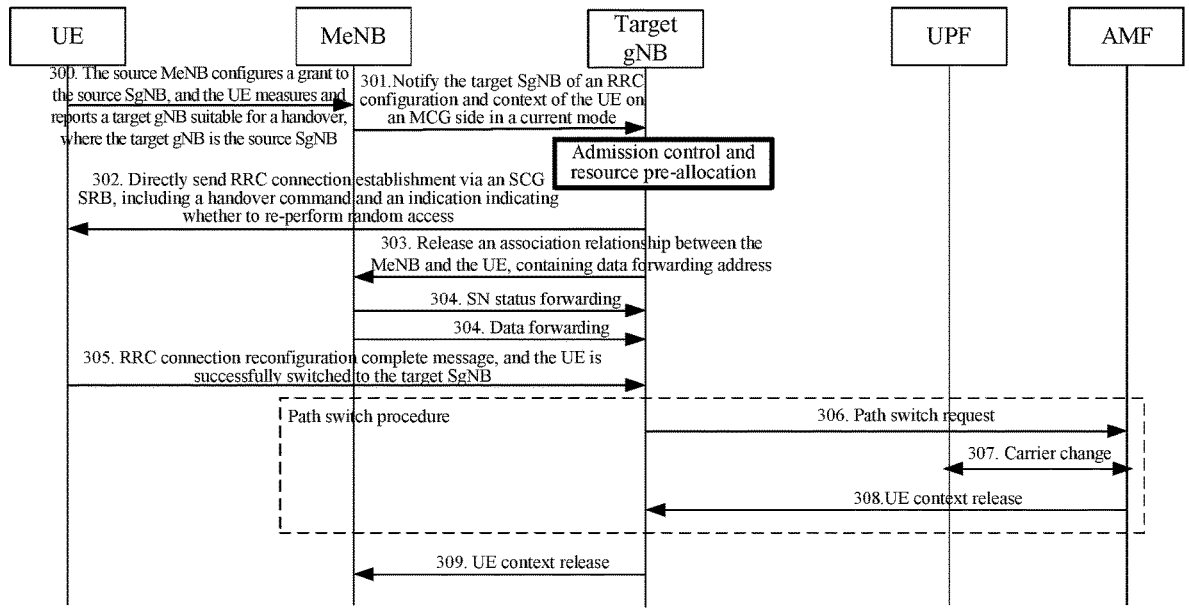
FIG. 7 is a flowchart of an example three of the present disclosure.

As shown in FIG. 7, in a deployment scenario of the NGEN-DC Option7 series, a source eLTE MeNB is connected under an AMF and a UPF of a 5G core network element, an inter-frequency source secondary 5G base station (SgNB) and the source MeNB are connected to each other via an Xn interface in the wireless macro coverage area of the source MeNB, and a certain specific UE has been configured to be in the NGEN-DC Option7 working mode. At a certain moment, when the source MeNB determines to switch the UE into a single-connect mode only having the source SgNB, the source SgNB in this example is also a target SgNB. The source MeNB and the source SgNB support the related content of the present disclosure.

In step 300, the source MeNB configures a grant to allow the source SgNB to fully control a handover procedure of a heterogeneous cross-RAT base station of the specific UE (in the NGEN-DC Option7 working mode) via an XnAP interface procedure message; the UE can directly report an RRM measurement result to the source MeNB via an MCG SRB as a handover judgment reference.

In step 301, based on RRM measurement report information of the UE, the source MeNB sends a handover request message (HO Request) to the target SgNB via the Xn interface, notifies the target SgNB of an RRC configuration and context of the UE on an MCG side in the NGEN-DC Option7 mode, and lets the target SgNB control the subsequent handover procedure.

In step 302, the target SgNB does not need to return a handover request acknowledgement message (HO Request ACK) to the source MeNB via the Xn interface, but the target SgNB directly sends an RRC connection reestablishment message to the UE via an SCG SRB, where the RRC connection reestablishment message contains a handover command, an indication indicating whether the UE needs to re-perform random access, and a new RRC configuration and context of the UE in the target SgNB. If the UE has kept uplink and downlink signal synchronization with the target SgNB, the UE may not need to initiate a random access procedure to the target SgNB. Therefore, optionally, the UE does not need reset a layer-2 user plane protocol entity, such as a PDCP or radio link control (RLC) and media access control (MAC), and user plane data transmission is not interrupted. RLC In step 303, the target SgNB directly sends a source master base station node release request message (MeNB Release Required) to the source MeNB via the Xn interface, and requires releasing an association relationship between the source MeNB and the UE (after that, the UE exits from the LADEN-DC Option7 dual-connectivity working mode and returns the single-connect mode only with the SgNB), where the source master base station node release request message contains data forwarding address information.

In step 304, the source MeNB transmits all DRB serial number status and uplink and downlink PDCP SDUs controlled by its anchor to the target SgNB via the Xn interface, ensuring continuity and data lossless of PDCP data units that are not successfully transmitted.

In step 305, when the UE disconnects a wireless connection with the source MeNB and is successfully switched to the serving cell under the target SgNB, the UE sends an RRC connection reconfiguration complete message for acknowledgement, then the target SgNB can perform uplink and downlink scheduling of all DRBs and data transmission on the UE, and the UE enters a single-connect working mode of a gNB.

In steps 306 to 308, a path switch procedure is performed.

In step 309, the target SgNB sends a UE context release command to the source MeNB.

In summary, based on the technical solutions provided by the embodiments of the present disclosure, in the NR and LTE DC (DC between 4G and 5G heterogeneous systems) configuration operations, the SN side is allowed to independently generate its own RRC PDU and independently configure a dedicated SCG SRB, and these changes may make the UE mobility management under the NR or LTE DC configuration operations different from the UE mobility management under the conventional LTE DC. When the NR or the LTE DC can use the SCG SRB more flexibly and safer, the SN can also partly participate in the handover management of the UE, reducing signaling overhead and data interruption delay during the entire handover process, and reducing an RRM processing load of the MN related to the UE mobility management, such as an RRM measurement algorithm, handover execution, and the like.

The embodiments of the present disclosure further provide a management equipment for a mobile handover. The equipment is configured in a source secondary base station and includes a processor, a memory and a communication bus.

The communication bus is configured to implement connection communication between the processor and the memory.

The processor is configured to execute management programs for the mobile handover stored in the memory to implement following steps:

when a set UE is determined to be switched to a target base station, and when the target base station and the source secondary base station are not a same base station, sending a handover request message to the target base station; and in response to receiving a handover request acknowledgement message sent by the target base station, sending a handover command message to the UE via an SCG SRB to trigger the UE to perform a random access attempt on a serving cell under the target base station.

In this embodiment, the processor is further configured to execute management programs for the mobile handover stored in the memory to implement the following step:

when the target base station and the source secondary base station are the same base station, after a handover request message sent by a source master base station is received, sending an RRC connection reestablishment message or an RRC connection reconfiguration message to the UE via the SCG SRB, where the RRC connection reestablishment message or the RRC connection reconfiguration message contains a handover command.

The embodiments of the present disclosure further provide a management equipment for a mobile handover. The equipment is configured in a source master base station and includes a processor, a memory and a communication bus.

The communication bus is configured to implement connection communication between the processor and the memory.

The processor is configured to execute management programs for the mobile handover stored in the memory to implement following steps:

configuring a grant to allow a source secondary base station to enable a function of performing mobile handover management on a set UE, where the configured grant at least includes parameter information about UE wireless connection security control, including an encryption key of a radio bearer and an integrity protection key;

when the source secondary base station determines to switch the set UE to the target base station, and when the target base station and the source secondary base station are not the same base station, receiving a source secondary base station node release request message forwarded by the source secondary base station, where the source secondary base station node release request message contains data forwarding address information;

releasing an association relationship with the UE according to the source secondary base station node release request message; and forwarding cached UE-related data via the source secondary base station according to the data forwarding address information.

In this embodiment, the processor is further configured to execute management programs for the mobile handover stored in the memory to implement following steps:

when the target base station and the source secondary base station are the same base station, obtaining RRM report information of the UE, and sending a handover request message to the target base station according to the RRM report information;

receiving a source master base station node release request message sent by the target base station, where the source master base station node release request message includes data forwarding address information;

releasing an association relationship with the UE according to the source master base station node release request message; and forwarding cached UE-related data according to the data forwarding address information.

The embodiments of the present disclosure further provide a storage medium. The storage medium is configured to store one or more programs executable by one or more processors to implement following steps:

when a set UE is determined to be switched to a target base station, and when the target base station and the source secondary base station are not the same base station, sending a handover request message to the target base station; and in response to receiving a handover request acknowledgement message sent by the target base station, sending a handover command message to the UE via an SCG SRB to trigger the UE to perform a random access attempt on a serving cell under the target base station.

In this embodiment, the one or more programs can further be executed by one or more processors to implement a following step:

when the target base station and the source secondary base station are the same base station, after a handover request message sent by a source master base station is received, sending an RRC connection reestablishment message or an RRC connection reconfiguration message to the UE via the SCG SRB, where the RRC connection reestablishment message or the RRC connection reconfiguration message contains a handover command.

The embodiments of the present disclosure further provide a storage medium. The storage medium is configured to store one or more programs executable by one or more processors to implement following steps:

configuring a grant to allow the source secondary base station to enable a function of performing mobile handover management on the set UE;

when the source secondary base station determines to switch the set UE to the target base station, and when the target base station and the source secondary base station are not the same base station, receiving a source secondary base station node release request message forwarded by the source secondary base station, where the source secondary base station node release request message contains data forwarding address information;

releasing an association relationship with the UE according to the source secondary base station node release request message; and forwarding UE-related data cached in a source master base station via the source secondary base station according to the data forwarding address information.

In this embodiment, the one or more programs can further be executed by one or more processors to implement following steps:

when the target base station and the source secondary base station are the same base station, obtaining RRM report information of the UE, and sending a handover request message to the target base station according to the RRM report information;

receiving a source master base station node release request message sent by the target base station, where the source master base station node release request message includes data forwarding address information;

releasing an association relationship with the UE according to the source master base station node release request message; and forwarding the UE-related data cached in the source master base station according to the data forwarding address information.

The above storage medium contains a number of instructions for enabling a computer device (which may be a personal computer, a server or a network device, etc.) or a processor to perform part of steps of the method described in any embodiment of the present disclosure. The storage medium may be a USB flash disk, a mobile hard disk, a read only memory (ROM), a random access memory (RAM), a magnetic disk, an optical disk or another medium that can store program codes.

The serial numbers of the embodiments described above of the present disclosure are merely for ease of description and do not indicate superiority and inferiority of the embodiments. From the description of the embodiments described above, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the existing art, may be embodied in the form of a software product. The computer software product is stored in a storage medium (such as an ROM/RAM, a magnetic disk or an optical disk) and includes several instructions for enabling a terminal device (which may be a mobile phone, a computer, a server, a network device, or the like) to execute the method according to each embodiment of the present disclosure.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

INDUSTRIAL APPLICABILITY

In the embodiments of the present disclosure, when a set UE is determined to be switched to a target base station, and when a target base station and a source secondary base station are not the same base station, the source secondary base station sends a handover request message to the target base station; and in response to receiving a handover request acknowledgement message sent by the target base station, a handover command message is sent to the UE by using an SCG SRB of a source secondary base station side to trigger the UE to perform a random access attempt on a serving cell under the target base station. The target base station receives the handover request message sent by the source secondary base station; preforms resource pre-allocation, RRC configuration and context generation in the target base station on the UE according to a parameter in the handover request message; and sends a handover request acknowledgement message to the source secondary base station, where the handover request acknowledgement message contains an RRC configuration and context in the target base station. Therefore, the SN side is allowed to independently generate its own RRC PDU and independently configure a dedicated SCG SRB. These changes can make the UE mobility management under the NR or LTE DC configuration operations different from the UE mobility management under the conventional LTE DC, and can also make the secondary node partly participate in the handover management of the UE, thereby reducing signaling overhead and data interruption delay during the entire handover process, and reducing an RRM processing load of the MN related to the UE mobility management, such as an RRM measurement algorithm, handover execution, and the like.

What is claimed is:

1. A management method for a mobile handover, applied to a source secondary base station, comprising:
   in response to determining to switch a set user equipment (UE) to a target base station, sending a handover request message to the target base station;
   in response to receiving a handover request acknowledgement message sent by the target base station, sending a handover command message to the UE via a secondary cell group signaling radio bearer (SCG SRB) of a source secondary base station side to trigger the UE to perform a random access attempt on a serving cell under the target base station;
   receiving a source secondary base station node release request message sent by the target base station, and forwarding the source secondary base station node release request message to the source master base station, wherein the source secondary base station node release request message contains data forwarding address information; and
   releasing an association relationship between the source secondary base station and the UE according to the source secondary base station node release request message, and forwarding UE-related data cached in the source secondary base station according to the data forwarding address information.

2. The method of claim 1, wherein the determining to switch the set UE to the target base station comprises:
   after a configured grant of a source master base station is obtained and a mobile handover management function is enabled, receiving radio resource management (RRM) report information obtained after the UE performs RRM measurement on an adjacent base station or serving cell, wherein the configured grant at least comprises parameter information about UE wireless connection security control, wherein the parameter information comprises an encryption key of a radio bearer and/or an integrity protection key; and
   in response to obtaining a base station suitable for handover according to the RRM report information, determining to switch the set UE to the target base station.

3. The method of claim 2, wherein the receiving the RRM report information obtained by the UE comprises:
   receiving RRM report information reported by the UE via the SCG SRB; or
   receiving RRM report information that is first reported to the source master base station via a master cell group (MCG) SRB of a source master base station side and then delivered by the source master base station.

4. The method of claim 1, wherein
   the handover request message comprises: a radio resource control (RRC) configuration and context of the UE in a current dual-connectivity or multi-connectivity mode; and/or
   the handover request acknowledgement message comprises: an RRC configuration and context of the UE in the target base station.

5. The method of claim 1, further comprising:
   delivering all data radio bearer (DRB) serial number status and uplink and downlink packet data convergence protocol service data units (PDCP SDUs), which are controlled by a DRB controlled by a source secondary base station anchor, to the target base station.

6. The method of claim 5, wherein
   the DRB controlled by the source secondary base station anchor comprises: an SCG bearer or an SCG split bearer, or an equivalent bearer type of the SCG bearer or the SCG split bearer.

7. A management method for a mobile handover, applied to a source master base station, comprising:
   configuring a grant to allow a source secondary base station to enable a function of performing mobile handover management on a set user equipment (UE), wherein the configured grant at least comprises parameter information about UE wireless connection security control, comprising an encryption key of a radio bearer and an integrity protection key;
   when the source secondary base station determines to switch the set UE to a target base station, receiving a source secondary base station node release request message forwarded by the source secondary base station, wherein the source secondary base station node release request message comprises data forwarding address information;
   releasing an association relationship with the UE according to the source secondary base station node release request message; and
   forwarding UE-related data cached in the source master base station via the source secondary base station according to the data forwarding address information.

8. The method of claim 7, further comprising:
   receiving a handover request acknowledgement message forwarded by the source secondary base station and sent by the target base station, wherein the handover request acknowledgement message comprises: an RRC configuration and context of the UE in the target base station.

9. The method of claim 7, further comprising:
   receiving radio resource management (RRM) report information reported by the UE via a master cell group signaling radio bearer (MCG SRB), and delivering the RRM report information to the source secondary base station.

10. A management method for a mobile handover, applied to a target base station, wherein the method comprises:
    receiving a handover request message sent by a source secondary base station;
    preforming resource pre-allocation, radio resource control (RRC) configuration and context generation in the target base station on a user equipment (UE) according to a parameter in the handover request message;

sending a handover request acknowledgement message to the source secondary base station, wherein the handover request acknowledgement message comprises an RRC configuration and context in the target base station; and sending a source secondary base station node release request message to the source secondary base station, wherein the source secondary base station node release request message is used for requesting the source secondary base station to release an association relationship between the source secondary base station and the UE and comprises data forwarding address information, such that the source secondary base station releases the association relationship between the source secondary base station and the UE according to the source secondary base station node release request message, and forwards UE-related data cached in the source secondary base station according to the data forwarding address information.

11. The method of claim 10, wherein the handover request message comprises: an RRC configuration and context of the UE in a current dual-connectivity or multi-connectivity mode.

12. The method of claim 10, further comprising:

receiving an RRC connection reconfiguration complete message sent when the UE successfully accesses a serving cell under the target base station by the UE, and performing uplink and downlink scheduling of all data radio bearers (DRBs) and data transmission on the UE.

* * * * *